Sept. 2, 1958     D. O. SEEVERS     2,850,642

NUCLEAR SPECTROSCOPY WITHOUT COMPTON BACKGROUND

Filed Oct. 7, 1954

INVENTOR
DELMAR O. SEEVERS
BY *A. L. Snow*
*Ralph L. Freeland Jr.*
ATTORNEYS

2,850,642

NUCLEAR SPECTROSCOPY WITHOUT COMPTON BACKGROUND

Delmar O. Seevers, Fullerton, Calif., assignor to California Research Corporation, San Francisco, Calif., a corporation of Delaware Application October 7, 1954, Serial No. 460,926

7 Claims. (Cl. 250—71)

The present invention relates to a method of and apparatus for recording a spectrum of nuclear energies, more particularly to a method for recording and transmitting a spectrum of neutron-capture gamma rays primarily representing the pair-production and photoelectric effect from an earth formation to a surface recording system, and has for an object the provision of a system adapted to receive selectively, but substantially simultaneously, nuclear energies, such as gamma rays arising from an earth formation during neutron irradiation, recording said energies detected by at least a pair of detectors as electrostatic charges on an intermediate storage system to integrate the relative abundance of particular gamma ray energies when interacting with said detectors either by the Compton effect or by the pair-production and photoelectric effect, and then transmitting to the earth's surface a low-frequency signal modulated in accordance with the difference in distribution of said electrostatic charges when one of said detectors is responsive to both pair-production, photoelectric and Compton effects, while the other is responsive only to Compton effect, to produce a record of said pair-production and photoelectric effects substantially free of the Compton background effect, normally present in the recording of neutron-capture gamma ray spectra.

In the detecting and recording of energies of neutron-capture gamma rays produced by the irradiation of an earth formation along a well bore by a neutron source, it is found that the use of a single scintillation crystal and photomultiplier tube combination results in a recorded energy spectrum that is made up of a continuum with peaks superimposed upon it. Though the energies of the gamma rays produced in the earth's formation are discrete and a function of the elements excited by the neutrons, the continuum results from: (1) degradation of the energy of some of the gamma rays in the earth formation by the Compton effect before the gamma rays enter the detector, and (2) interaction by the Compton effect of the gamma rays that enter the scintillation crystal. The peaks superimposed on the continuum are due to gamma rays interacting with the crystal by the photoelectric and pair-production effects. Since the peaks are the components of the spectrum that make it possible to identify individual constituents of an earth formation, the diagnostic characteristics of the measured signals may be greatly increased if the continuum due to the Compton effect in the crystal can be substantially reduced in the recorded signal.

Various methods have been suggested for elimination of the background of Compton effect, such as by use of a plurality of crystals connected as individual scintillation counters connected in circuits which exclude all detected nuclear events which do not occur simultaneously in the plurality of crystals. Such selective interaction and recording of only those events occurring simultaneously in a plurality of detectors, presents serious limitations as to the speed with which the logging apparatus may be drawn through the well bore to record a statistically reliable number of nuclear interactions. However, I have found that by the provision of at least two crystals, one of which is primarily responsive to the Compton effect and the other of which is responsive to the Compton, photoelectric and pair-production effects, there may be provided a logging system wherein the apparatus for irradiating and detecting may be operated at a relatively high speed, without loss of the diagnostic information normally involved in the operation of a plurality of crystals connected as a pair spectrometer. Additionally, said system provides an arrangement not only for detecting both the Compton effect and the plural effects of Compton, photoelectric and pair production, but also for transmitting the resultant signals to the earth's surface for recording during the logging run. In accordance with a preferred form of apparatus for carrying out the present invention, said signals are stored and transmitted by a system similar to that disclosed in my copending application, Ser. No. 433,244. As therein disclosed, the individual nuclear events are recorded as electrostatic charges on a storage surface and positioned thereon in accordance with their individual energies. The accumulated electrostatic charges may then be transmitted over a conventional well logging cable of limited power and narrow frequency-band characteristics.

In accordance with an important aspect of the present invention, there is provided a system for storing the characteristic bits of information representing the interaction of individual gamma rays with a scintillation crystal, primarily responsive to Compton scattering, and at the same time recording similar bits of information representing the interaction of gamma rays with a scintillometer responsive not only to Compton scattering but also to photoelectric and pair-production effects. Preferably, the signals from each of the detectors is alternately accumulated in a predetermined position on an electrostatic storage surface of a cathode ray storage tube, with each bit of information being distributed in an area corresponding to its source and in accordance with the magnitude of each gamma ray detected by said source. In a preferred manner of operation, these bits of information are stored on a circular storage target with the low-energy gamma rays being accumulated as electrostatic charges around the outer periphery of said storage surface and the higher energy gamma rays being deposited as electrostatic charges near the center of the storage surface. Each of the electrical pulses of equal magnitude, representing the energy of the gamma rays, surrendered to the crystals by interaction therewith, are deposited on circles of equal radius but with the gamma rays arising from one crystal being deposited on one half of the storage surface, and those from the other crystal on the other half. The target surface is then circularly scanned in a spiral manner and the resultant signal treated in such a way as to subtract the effect of the scintillation counter representing only Compton effect from the signal representing the composite Compton, photoelectric and pair-production effects. The resultant D. C. signal may then be transmitted over a conventional well logging cable to a surface recording system to produce a visual record at the earth's surface which represents only the photoelectric and pair-production effects, with the Compton scattering effect either substantially eliminated, or greatly reduced.

In a preferred form of apparatus for performing the method of the present invention, a single pulse amplifying and delay gate arrangement is alternately connected to the two gamma ray energy measuring scintillation detectors and the input of an intermediate storage system alternately connected through said pulse amplifier to the two scintillation counters. In said preferred form, switching of the input to the pulse amplifier is accomplished by a synchronously operated vibrator adapted to ground one of the early stages of the photomultiplier tube while the other photomultiplier tube is connected to the amplifier input. By synchronization of said switch system with the scanning system for the storage target surface, the input from one of the detectors may be applied to one-half of the storage area during one half cycle and the input from the other detector applied to the other half during the succeeding half cycle.

The subtraction is accomplished by a synchronously controlled double-throw, double-pole vibrator serving as a reversing switch so that the signal into the amplifier is positive when the section of the target is scanned that contains the stored information from one scintillation detector and is negative when the other section is scanned. By the choice of proper time constants in the amplifier, the output of the amplifier will correspond to the difference between the switched signals.

Further objects and advantages of the present invention will become apparent from the following detailed description taken in conjunction with the accompanying drawings.

Figure 1A:
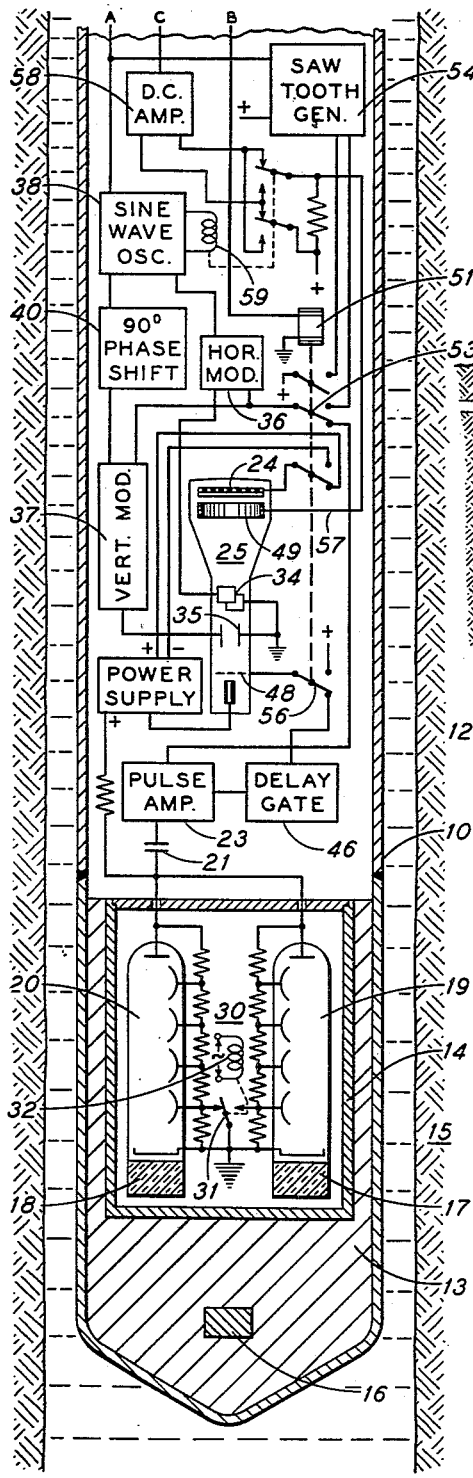
Fig. 1A is a schematic representation of the lower end of a well logging sonde incorporating the present invention.
Figure 1B:
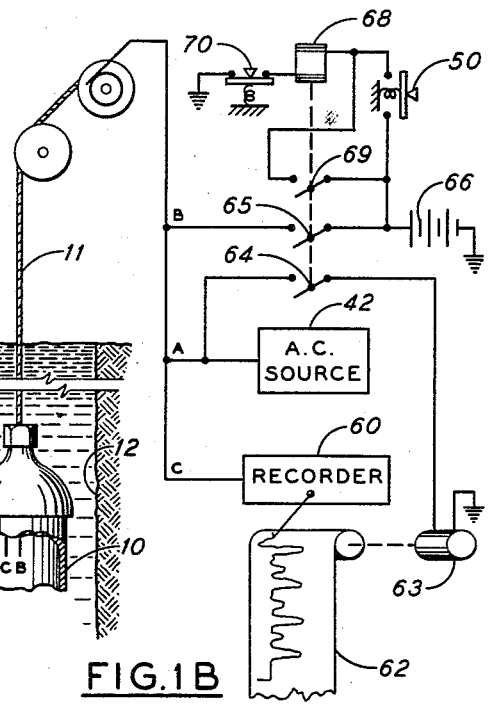
Fig. 1B is a schematic representation of the upper end of the well logging sonde shown in Fig. 1A (reduced in size) and its connection through the well logging cable to a surface recording system.

Referring now to the drawings, and in particular to the arrangement of Fig. 1A, there is illustrated a preferred form of well logging apparatus adapted to generate and transmit a spectrum of nuclear energies representing constituent elements in earth formations traversed by the well bore. A logging sonde 10, adapted to be raised or lowered on well logging cable 11 within well bore 12, is arranged to produce an energy spectrum of neutron-capture gamma rays from earth formations, such as formation 15, adjacent the well logging sonde 10, by irradiating said formation 15 with neutrons from a neutron source 16. The resulting neutron-capture gamma rays emitted by excited nuclei within the formation, upon capture of neutrons, reenter the bore hole 12 so that they may be detected and their energies measured by the scintillation crystals 17 and 18 positioned within the well logging sonde 10.

In accordance with the present invention, the crystals 17 and 18 are constructed of materials which preferentially interact with the neutron-capture gamma rays in different manners. For example, the crystal 17 may be constructed of sodium iodide activated by thallium and, accordingly, be capable of detecting gamma rays arising within formation 15 which are of sufficient energy to penetrate the two shields 13 and 14 and interact with the elements of the crystal, and thereby surrender their energy thereto, by forming light pulses corresponding in magnitude to the surrendered energy of said gamma rays. Such a crystal will be sensitive to gamma rays of relatively low energy, say 1 m. e. v. to 3 m. e. v., which preferentially interact by the Compton recoil effect, by surrendering a portion of their full energies to the crystal by ionization and creation of light pulses. Additionally, crystal 17, due to its constituents of high atomic number, will cause some of the gamma rays to interact with the crystal elements by the photoelectric effect which causes surrender of the entire energy of the gamma ray to the crystal and some by the pair-production effect which may either cause surrender of the entire energy of the gamma ray within the confines of the crystal or result in the escape of one or both annihilation quanta from the crystal. As employed in the recording of neutron-capture gamma ray energy spectra by previously known systems, the energies of the individual gamma rays are measured by a single crystal responsive to the Compton effect, the photoelectric effect, and the pair-production effect. Said spectrum includes a very large number of gamma ray energies from which there must be isolated a small difference in such numbers to identify the generating sources of the neutron-capture gamma rays.

In accordance with the present invention, the auxiliary or other scintillation crystal 18 is preferably constructed of a material such as anthracene or other material of lower atomic number so that gamma rays intercepted and detected therein preferentially react with the crystal elements by the Compton scattering or recoil effect. The output of each of the two crystals 17 and 18 is then converted from light pulses to electrical pulses of similar magnitude to the intensity of the light produced in crystals 17 and 18. As shown, the photomultiplier tubes 19 and 20 are optically coupled to crystals 17 and 18, respectively. The output of both tubes 19 and 20 is then connected through a single input condenser 21 to a single pulse amplifier 23, which is adapted to apply the pulses developed by photomultiplier tubes 19 and 20 to the electrostatic storage surface 24 of cathode ray storage tube 25.

As particularly shown, the pulses from crystals 17 and 18 are alternately applied to the storage surface 24 by pulse amplifier 23 and the associated electronic equipment, in response to a frequency-controlled switch or vibrator identified as 30. Switch 31 of vibrator 30 is arranged to alternately connect the first dynode of the respective photomultiplier tubes 19 and 20 to ground, thereby reducing the output of the tube to substantially zero by shorting an early stage in that photomultiplier tube. As will be explained more fully hereinafter, the power applied to coil 32 of vibrator 30 is synchronously controlled with the sweep or deflection of the cathode ray beam within storage tube 25 to provide control of the positioning of the electrostatic charges, which represent the energy and frequency of occurrence of the electrical pulses corresponding to the gamma rays detected by crystals 17 and 18.

A preferred method of operating the cathode ray storage tube, wherein each of the gamma ray energies is recorded and stored, contemplates the storage of a complete spectrum representing the constituent elements of earth formation 15 so that said spectrum may be recorded at the earth's surface during the logging run. The present system has been illustrated as being controlled to store such spectrum by circularly scanning the storage surface 24 by the cathode ray beam.

A detailed description of one method of circularly scanning such a cathode ray storage tube, to record a spectrum of nuclear energies, is disclosed in U. S. application Serial No. 451,525, filed August 23, 1954 in the name of Calvin M. Clark, a co-employee, which application is assigned to the assignee of the present invention. As explained in the Clark application, the cathode ray beam generated in storage tube 25 is essentially controlled in its scanning movement by electrostatic deflection plates 34 and 35 which are respectively connected to horizontal deflection modulator 36 and vertical deflection modulator 37. Both modulators 36 and 37 are operated from a common A. C. source through a sine wave oscillator 38, with the vertical modulator being displaced exactly ninety degrees with respect to the horizontal modulator by the ninety-degree phase-shift network 40.

Figure 2B:
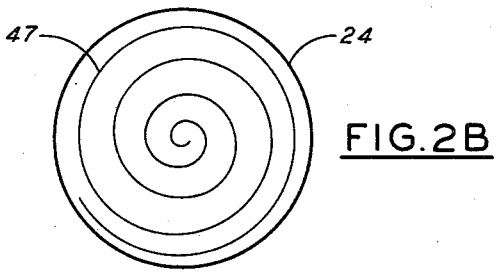
Fig. 2B is a schematic representation of the manner in which the cathode ray beam may be made to scan the storage surface area of the cathode ray tube to produce a record substantially free of the background Compton effect on a nuclear energy spectrum.
Figure 2A:
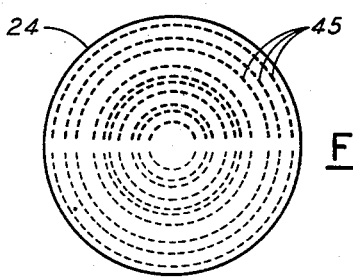
Fig. 2A is a schematic representation of the method of storing electrostatic charges on the surface of the cathode ray storage tube utilized in the arrangement of Fig. 1A.

In the preferred manner of operating the arrangement of Fig. 1A, deflection modulators 36 and 37 are operated at a relatively low frequency through sine wave oscillator 38 supplied from the surface A. C. source identified as 42 and transmitted to the logging sonde over well logging cable 11 through line A. Simultaneously, as mentioned above, the vibrator 30 is operated through the same source of alternating current so that switch element 31 on each half cycle of A. C. connects the output of either photomultiplier tube 19 or 20 to the pulse amplifier 23, so that electrostatic charges of a determinable magnitude may be applied to one half of the electrostatic storage surface 24 during one half cycle by one of the photomultiplier tubes and to the other half of surface 24 during the other half cycle by the other tube. As indicated in Fig. 2A, these electrostatic charges, represented by the dots 45, are applied to storage surface 24 by gating the cathode ray beam to a conductive condition when each pulse representing the energy of a gamma ray has attained its maximum amplitude. In the arrangement of Fig. 1A, this function is accomplished through delay gate 46 controlling the potential applied to grid 48 of storage tube 25. In storage tube 25, electrostatic charges are thus applied to the storage surface 24, which comprises an insulating surface and a conducting screen bonded together, by bombarding the insulating surface by the high-energy electron beam generated by the tube under proper accelerating potentials. When the electron beam is gated to a conducting condition, it strikes the normally insulating surface, and secondary electrons are emitted from the uniformly charged insulating coating to collector ring 49, thereby leaving a positive electrostatic charge, as represented by dots 45, on the exact area where the cathode ray beam has contacted the storage surface. As shown in the schematic arrangement of Fig. 2A, the gamma rays detected in crystal 17 are thus selectively applied to the upper half of storage surface 24. It will be observed that the heavier dots shown in the upper half represent a large number of individual gamma rays whose energies correspond to the radii of the concentric circles. Said circles represent the bits of information obtained from crystal 17 due to the photoelectric effect, the pair-production effect and the Compton scattering effect occurring within that crystal. The opposite half of the storage surface, which is connected to pulse amplifier 23 during the other recording cycle, is arranged to store charges representing gamma rays interacting with crystal 18 which is predominantly the Compton effect alone. It will thus be seen that the two halves of the storage surface 24 contain a composite of information representing in the upper half the photoelectric effect, the pair-production effect, as well as the Compton scattering effect, while the lower half of the storage area contains only the Compton effect. The positions of the concentric circles in the present embodiment are predetermined by the energizes of the gamma rays causing the deposition of the electrostatic charges. In the preferred manner of distributing these various energies on the storge surface, those gamma rays of highest energy are positioned nearest the center of the target, while those of lower energy are progressively distributed along circles of increasing radii so that the lowest-energy gamma rays are stored as electrostatic charges around the outer periphery of the target.

After a predetermined length of the formation 15 has been traversed, or after a predetermined length of time for the exposure of a particular part of the formation to neutrons, the stored spectrum, representing the difference between that portion which includes both Compton, photoelectric and pair-production effects and that which contains only the Compton effect, may be transmitted to the earth's surface over well logging cable 11 by changing the operating potentials of the cathode ray storage tube 25 to a reading or transmission condition. In the present embodiment, this is accomplished from the earth's surface by a system which includes push-button 50, adapted to control the energization of relay 51 located in the logging sonde 10. The various contacts of relay 51 may thus connect the proper operating potentials to the various electrodes of tube 25 and, simultaneously, connect the horizontal and vertical modulators 36 and 37, through switch 53, to a variable D. C. potential supplied by saw-tooth generator 54. Saw-tooth generator 54 is arranged to supply a linearly varying D. C. potential in synchronism with the regulated frequency, such as 60-cycle A. C., so that the cathode ray beam of storage tube 25 will be progressively varied in its radius to sweep circularly around the target surface 24 in the form of a spiral motion, as indicated by the line 47 in Fig. 2B. At the same time, the grid 48 is connected to a biasing potential through contact 56 of relay 51 so that the cathode ray beam will generate a signal at collector ring 49 representative of the distribution of electrostatic charges on storage surface 24 and simultaneously return that storage surface to substantially an equal potential throughout its surface.

In the arrangement of Fig. 1A, the positively charged electrostatic areas 45 will cause electron flow from the collector ring 49 to the electrostatic storage surface and thereby generate a D. C.-modulated signal which may be transmitted to the surface for recording by way of line 57 of D. C. amplifier 58. In accordance with the present invention, the preferred method of subtracting the signal of one segment of the storage target from the signal of the other segment is through synchronism vibrator 59 and amplifier 58. Vibrator 59 is operated by sine wave oscillator 38 so that the polarity of the signal from the collector 49 is switched synchronously with the traversal of the cathode ray beam across the segments of the storage surface 24. Amplifier 58 desirably has a time constant such that the signal transmitted over line C to the surface recorder 60 corresponds to the difference between the two stored signals. In this way, the input signal to amplifier 58 is the difference between the bits of information on the upper and lower halves of target 24, as those areas are identified in Fig. 2A. Accordingly, the desirable signal recorded is the difference between the total nuclear events occurring in crystals 17 and 18 over both a comparable period of time and a comparable interval of earth formation 15 along the well bore.

While, as mentioned above, the resultant signals remaining as the difference between the events detected by an anthracene crystal and a sodium iodide crystal are desirably recorded as the difference between such detectors, it is, of course, possible to select crystals which are sensitive to other nuclear events, and in different ratios relative to each other, so that the present apparatus may be operated to provide an integrated picture of the events detected in a plurality of crystals, with the output of each being recorded on a distinct area of an intermediate storage target, such as electrostatic storage surface 24. It will, of course, be apparent that the storage area 24 may be divided into other equal sectors, such as three equal area sectors or more. With each sector receiving electrostatic charges in accordance with the output of an individual crystal and photomultiplier tube combination, as is well understood in the art, the total difference in all of the electrostatic charges accumulated around each area of equal diameter on the storage surface may either be added together or subtracted one from the other to provide an output signal representative of either a composite spectrum or a particular part of a single nuclear spectrum.

In the present embodiment, as mentioned above, there is transmitted to the surface recording unit 60 and recorded on chart paper 62 a spectrum which is substantially due to the photoelectric and pair-production effect, alone without the masking effect of a large number of Compton scattering reactions by gamma rays with the crystal material. The operation of the chart 62 is desirably in synchronism with movement of the electron beam in storage tube 25 and is controlled by the synchronously operated motor 63 which is likewise operated from common A. C. source 42, as are the vertical and horizontal deflection modulators 36 and 37 and the saw-tooth generator 54. As shown, motor 63 begins its operation in response to start switch 50, closing contact 64 to energize motor 63. At the same time, the relay 51 in logging sonde 10 is energized through contact 65 by a D. C. source, such as battery 66. As illustrated, switch 50 performs all of these operations through relay 68, which is held closed through its contact 69 and whose operation may be interrupted by push-button 70.

An alternative arrangement for depositing the electrostatic charges 45 on target 24 may be provided by switching the operating potentials of storage tube 25 in synchronism with the operation of vibrator 30. By causing the electrostatic storage surface to be alternately made relatively positive and negative during the deposition of charges, the individual charges 45 on the upper half, for example, may be made positive relative to charges of the same magnitude on the lower half. In this way, the readout of the stored charges may be accomplished by continuous scanning of the storage surface with the cathode ray beam, without requiring switching of the output to amplifier 58 through vibrator 59.

It will be apparent that the detecting and transmission of gamma ray spectra may be accomplished by the above-described system whether such gamma rays are of the neutron induced type, either emitted instantaneously or after a short delay, or those naturally present in earth formations traversed by a well bore.

While various modifications and changes may be made in the system described hereinbefore, all such modifications and changes which fall within the scope of the appended claims are intended to be included therein.

I claim:

1. The method of transmitting a spectrum of the pair production energies of neutron-capture gamma rays arising from an earth formation traversed by a bore hole which comprises irradiating said earth formation with a source of substantially pure neutrons, detecting neutron-capture gamma rays originating in the nuclei of constituent elements within said formation with at least a pair of gamma ray detectors, one of said detectors being sensitive to gamma rays of energies producing Compton effect absorption of the energies and the other of said detectors being responsive to the Compton, photoelectric, and the pair production effects, alternately generating electrical pulses in response to the output of said detectors, converting said electrical pulses to electrostatic charges positionable upon an electrostatic storage surface within said well bore, recording the pulses representing gamma ray energies detected by one of said detectors on a first portion of said electrostatic storage surface and positioning the electrostatic charges representative of the energies detected by said other detector on another portion of said surface, accumulating said alternately stored electrostatic charges on said storage surface over a predetermined interval, generating a D. C. potential modulated in accordance with the comparable positions of said charges on said storage surface, differentiating said D. C. potential in accordance with the difference in the number of charges of each energy stored on said surface, and recording said modulated D. C. signal at the earth's surface, said record being substantially free of the Compton background effect to emphasize substantially the photoelectric and pair production effects and permit identification of the type of nuclei from which said gamma rays arise.

2. In a well logging apparatus for generating and transmitting a spectrum of nuclear energies to a surface recording system, means for irradiating an earth formation with neutrons, at least a pair of of gamma ray detectors, including a scintillometer, one of said detectors being a scintillometer responsive to substantially low-energy gamma rays and the other detector being a scintillometer responsive to both high-energy gamma rays and low-energy gamma rays, an intermediate storage means for accumulating a spectrum of nuclear energies within said well bore and adjacent said scintillometers, circuit means for applying electrostatic pulses to one portion of said intermediate storage device in accordance with gamma rays received by one of said detectors and applying charges representing the other of said detectors on another portion of said storage surface, means for generating a D. C. potential modulated in accordance with the difference in distribution of said electrostatic charges on said two portions of said storage surface, and means for recording said D. C. potential at the earth's surface as a measurement of the relative quantity of characteristic nuclei generating high energy gamma rays in said formation during neutron irradiation.

3. Well logging apparatus for recording a spectrum of selected nuclear energies at a surface recorder which comprises means for irradiating an earth formation traversed by a well bore with a source of neutrons in said well bore, at least a pair of nuclear event detectors positioned within said bore hole and shielded from said neutron source, one of said detectors being responsive to a first type of nuclear event and the other being responsive to another type of nuclear event, means for converting each of said nuclear events to an electrostatic charge positionable on an electrostatic storage surface in accordance with its energy and the detector in which said event occurred, means for positioning each charge corresponding to one of said events within its prescribed storage area, means for generating a D. C. potential modulated in accordance with the distribution of all of said electrostatic charges on said storage surface, and means for recording said D. C. potential at the earth's surface as a measurement of the relative abundance of characteristic elements in said formation producing said nuclear events upon irradiation by said neutron source, said recording being in accordance with the depth of said source in the well bore.

4. Well logging apparatus for detecting and transmitting a spectrum of nuclear energies to a surface recording system comprising at least a pair of nuclear energy detectors, each comprising a scintillation crystal and a photomultiplier tube, one of said scintillation crystals being primarily responsive to low-energy nuclear events and the other crystal being responsive to both high-energy and low-energy nuclear events, means including said photomultiplier tube for converting each nuclear event detected in its associated crystal into an electrostatic charge, means for positioning each of said electrostatic charges on a storage surface in accordance with both the energy of said event and the crystal in which said event originated, means for scanning said electrostatic storage surface to detect the distribution of a plurality of said charges, means for generating a D. C. potential in accordance with said charge distribution, means for subtracting one portion of said D. C. potential from another portion of said potential to produce a resultant signal representing substantially only the high-energy nuclear events recorded on said storage surface, and means for recording said resultant signal at the earth's surface in accordance with the depth of said detectors in said well bore.

5. The method of recording a gamma ray spectrum generated in an earth formation traversed by a well bore while a detector system is passing through said bore hole, which comprises detecting gamma rays originating in constituent elements within said formation by subjecting at least a pair of scintillation crystals to said gamma rays, one of said crystals being sensitive primarily to gamma rays interacting with said crystal by the Compton scattering effect and the other of said crystals interacting with said gamma rays by Compton scattering, photoelectric and pair-production effects, converting each interaction of a gamma ray with one of said crystals to an individual electrical pulse corresponding in magnitude to the energy surrendered by the gamma ray upon interaction with said crystal, alternately converting electrical pulses produced by gamma rays interacting with one of said pair of crystals to electrostatic charges, depositing said electrostatic charges generated by each of said pair of crystals on different predetermined portions of a storage surface positioned in the vicinity of said crystals, each of said electrostatic charges being further positioned in accordance with the energy of the interaction of said gamma rays with the crystal creating said charge, accumulating the alternately deposited electrostatic charges over a predeterminable time interval, generating a substantially D. C. potential in accordance with the comparable positions of charges on said storage surface, modulating said D. C. signal in accordance with the difference in the number of charges representing each gamma ray energy stored in response to one of said crystals and those of the same energy stored by the other of said crystals, and recording said modulated signal at the earth's surface to provide a record of the gamma ray energy spectrum containing substantially only the photoelectric and pair-production effects to permit identification of the nuclei in which said gamma rays originated in said earth formation.

6. Well logging apparatus for detecting and transmitting a spectrum of gamma ray energies to a surface recording system comprising at least a pair of scintillation crystals adapted to interact with gamma rays to produce a total number of light quanta proportional to the energy each gamma ray surrenders in one of said crystals, one of said crystals being primarily adapted to interact with gamma rays by the Compton scattering effect and another of said crystals being primarily responsive to a combination of interactions with gamma rays including Compton scattering, photoelectric and pair-production effects, means for converting said total number of light photons to an electrical pulse of corresponding magnitude, said converting means including means for generating an electrostatic charge positionable on an electrostatic storage surface in accordance with the magnitude of said pulse, means for positioning said electrostatic charges generated by interactions in one of said crystals on a first predetermined portion of said electrostatic storage surface and those generated in the other crystal on another predetermined portion of said storage surface, means for scanning said storage surface to subtract the number of charges on one of said portions from those on the other portion of said surface, means for producing an electrical signal representing the difference in said number of charges as a measure of the peaks in the gamma ray energy spectrum due to pair-production and photoelectric effects, and means for transmitting a substantially D. C. signal modulated in accordance with said electrical signal to recording means at the earth's surface for visual observance of the spectrum of gamma ray energies, said recording means being operable in accordance with the depth of said apparatus in a well bore.

7. Apparatus for detecting and transmitting a spectrum of gamma ray energies to a recording system comprising at least a pair of scintillation crystals adapted to interact with gamma rays to produce a total number of light quanta proportional to the energy each gamma ray surrenders in one of said crystals, one of said crystals being primarily adapted to interact with gamma rays by the Compton scattering effect and another of said crystals being primarily responsive to a combination of interactions with gamma rays including Compton scattering, photoelectric and pair-production effects, means for converting said total number of light photons to an electrical pulse of corresponding magnitude, said converting means including means for generating an electrostatic charge positionable on an electrostatic storage surface in accordance with the magnitude of said pulse, means for positioning said electrostatic charges generated by interactions in one of said crystals on a first predetermined portion of said electrostatic storage surface and those generated in the other crystal on another predetermined portion of said storage surface, means for scanning said surface to subtract the number of charges on one of said portions from those on the other portion of said surface, means for producing an electrical signal representing the difference in said number of charges as a measure of the peaks in the gamma ray energy spectrum due to pair-production and photoelectric effects, means for generating a substantially D. C. signal modulated in accordance with said electrical signal, and recording means for indicating the peaks of said spectrum of gamma ray energies.

References Cited in the file of this patent

UNITED STATES PATENTS

| | | |
|---|---|---|
| 2,535,817 | Skellett | Dec. 26, 1950 |
| 2,659,011 | Youmans et al. | Nov. 10, 1953 |
| 2,686,268 | Martin et al. | Aug. 10, 1954 |

OTHER REFERENCES

"Two Crystal Gamma-Ray Scintillation Spectrometer," by R. E. Connally, from the Review of Scientific Instruments, vol. 24, No. 6, June 1953, pgs. 458, 459.